United States Patent
Kim et al.

(10) Patent No.: US 8,547,488 B2
(45) Date of Patent: Oct. 1, 2013

(54) OPTICAL UNIT AND DISPLAY DEVICE HAVING THE SAME

(75) Inventors: Beom-Shik Kim, Yongin (KR); Hui Nam, Yongin (KR)

(73) Assignee: Samsung Display Co., Ltd., Yongin, Gyeonggi-Do (KR)

(*) Notice: Subject to any disclaimer, the term of this patent is extended or adjusted under 35 U.S.C. 154(b) by 5 days.

(21) Appl. No.: 13/137,912

(22) Filed: Sep. 21, 2011

(65) Prior Publication Data

US 2012/0113336 A1 May 10, 2012

(30) Foreign Application Priority Data

Nov. 4, 2010 (KR) .................... 10-2010-0109159

(51) Int. Cl.
*G02F 1/1335* (2006.01)

(52) U.S. Cl.
USPC .............. 349/15; 349/139; 349/141; 359/462

(58) Field of Classification Search
USPC ........................................................ 359/462
See application file for complete search history.

(56) References Cited

U.S. PATENT DOCUMENTS

| | | | |
|---|---|---|---|
| 6,069,650 A | | 5/2000 | Battersby |
| 6,704,083 B1* | | 3/2004 | Kim et al. ................. 349/139 |
| 8,072,552 B2* | | 12/2011 | Robinson ................. 349/15 |
| 2006/0082519 A1* | | 4/2006 | Nam et al. ................. 345/9 |
| 2008/0218459 A1* | | 9/2008 | Kim et al. ................. 345/87 |
| 2011/0205342 A1* | | 8/2011 | Lin et al. ................. 348/54 |
| 2011/0285953 A1* | | 11/2011 | Liu et al. ................. 349/141 |

FOREIGN PATENT DOCUMENTS

| | | |
|---|---|---|
| JP | 10-010523 A | 1/1998 |
| KR | 10 2004-0026032 A | 3/2004 |
| KR | 10-0440956 B1 | 7/2004 |
| KR | 10 2007-0070327 A | 7/2007 |
| KR | 10 2008-0048331 A | 6/2008 |
| KR | 10 2008-0105549 A | 12/2008 |

* cited by examiner

*Primary Examiner* — Bumsuk Won
*Assistant Examiner* — Ryan Crockett
(74) *Attorney, Agent, or Firm* — Lee & Morse, P.C.

(57) ABSTRACT

A display device includes: a display unit, displaying an image; and an optical unit including a first substrate on the display unit, a first electrode on the first substrate, a liquid crystal layer on the first electrode and configured to be responsive to a vertical electric field or a horizontal electric field, a second electrode on the liquid crystal layer, an insulation layer on the second electrode, a third electrode on the insulation layer, and a second substrate on the third electrode.

20 Claims, 12 Drawing Sheets

OPTICAL UNIT AND DISPLAY DEVICE HAVING THE SAME

CROSS-REFERENCE TO RELATED APPLICATION

This application claims priority to and the benefit of Korean Patent Application No. 10-2010-0109159 filed in the Korean Intellectual Property Office on Nov. 4, 2010, the entire contents of which are incorporated herein by reference.

BACKGROUND

1. Field

Embodiments relate to an optical unit. More particularly, embodiments relate to an optical unit recognizing images displayed through a display unit into 3D images as a stereoscopic image, and a display device including the same.

2. Description of the Related Art

Recently, a 3D display has been applied to various fields, i.e., medicine, games, advertisements, education, military, etc. A holographic or stereoscopic scheme has been studied as a scheme to display 3D images.

The stereoscopy scheme separates two 2D images having binocular disparity into left and right eyes of a user, respectively. Thus, a person may recognize 3D images. In the stereoscopy scheme, there is a spectacles scheme using polarization and shutters as a unit to see images separated for both eyes and a non-spectacles scheme forming a visual field by directly dividing images from a display.

The information in the Background is only for enhancing an understanding of the described technology. Thus, it may contain information that does not form the prior art already known to a person of ordinary skill in the art in this country.

SUMMARY

An exemplary embodiment may be directed to an optical unit and a display device including the same capable of selecting a spectacles scheme and a non-spectacles scheme.

A first embodiment may provide a display device including: a display unit, displaying an image; and an optical unit including a first substrate on the display unit, a first electrode on the first substrate, a liquid crystal layer on the first electrode and configured to be responsive to a vertical electric field or a horizontal electric field, a second electrode on the liquid crystal layer, an insulation layer on the second electrode, a third electrode on the insulation layer, and a second substrate on the third electrode.

The first electrode may include: a plurality of first sub-electrodes separated from each other and extending in a first direction; a first connection electrode connecting ends of the plurality of first sub-electrodes; a plurality of the second sub-electrodes between neighboring first sub-electrodes of the plurality of first sub-electrodes, the second sub-electrodes separated from each other and extending in the first direction; and a second connection electrode separated from the first connection electrode via a second sub-electrode of the plurality of second sub-electrodes, the second sub-electrode interposed between the second connection electrode and the first connection electrode, and connecting ends of the plurality of second sub-electrodes.

The third electrode may have a plate shape.

The liquid crystal layer may be configured to be responsive to the vertical electric field.

The third electrode may be applied with a first voltage, and a first sub-electrode of the plurality of first sub-electrodes may be applied with a second voltage greater than the first voltage.

The second electrode and the second sub-electrode of the plurality of second sub-electrodes may be applied with the first voltage.

The liquid crystal layer may include a liquid crystal, the liquid crystal corresponds to the neighboring first sub-electrodes and has a lens shape, and the display unit may display a left-eye image and a right-eye image as an image between the neighboring first sub-electrodes.

The liquid crystal layer may be configured to be responsive to the horizontal electric field.

The optical unit may further include an alignment layer at least one of between first electrode and the liquid crystal layer and between the second electrode and the liquid crystal layer and rubbed in the second direction intersecting the first direction.

The second electrode may include a plurality of the third sub-electrodes separated from each other and extending in the second direction.

The plurality of third sub-electrodes may include a plurality of openings separated from and extending in the second direction.

A third voltage may be sequentially applied from one of the third sub-electrodes which third sub-electrode is adjacent to one end of the second substrate to another third sub-electrode of another end of the second substrate of the plurality of third sub-electrodes, and the third electrode may be applied with a fourth voltage.

The liquid crystal layer may include a liquid crystal, the liquid crystal corresponds to the third sub-electrode applied with the third voltage and may be arranged such that the long axis thereof may be aligned in a direction parallel to the first direction, and the display unit may display one image of a left-eye image and a right-eye image as an image corresponding to the third sub-electrode applied with the third voltage.

The second electrode may include: a plurality of the fourth sub-electrodes separated from each other and extending in the second direction; a third connection electrode connecting the ends of the plurality of fourth sub-electrodes; a plurality of fifth sub-electrodes between neighboring fourth sub-electrodes of the plurality of fourth sub-electrodes, the fifth sub-electrodes being separated from each other and extending in a second direction; and a fourth connection electrode separated from the third connection electrode via a fifth sub-electrode interposed therebetween and connecting ends of the plurality of fifth sub-electrodes.

A fourth sub-electrode of the plurality of fourth sub-electrodes and the fifth sub-electrode of the plurality of fifth sub-electrodes may be applied with a fifth voltage.

The liquid crystal layer may include a liquid crystal, the liquid crystal corresponds to the fourth sub-electrode and the fifth sub-electrode applied with the fifth voltage, the liquid crystal may be arranged such that a long axis thereof may be arranged in a direction parallel to the first direction, and the display unit may display one image of a left-eye image and a right-eye image as an image.

Polarizing spectacles facing the optical unit and including a left eye polarizing plate having one optical axis among a first optical axis parallel to the first direction and a second optical axis parallel to the second direction and a right eye polarizing plate having the other optical axis among the first optical axis and the second optical axis may be further included.

The optical unit may further include a first retarder on the second substrate, and the polarizing spectacles may further include a second retarder on the left eye polarizing plate and the right eye polarizing plate and facing the first retarder.

The first retarder and the second retarder may be ¼ wavelength plates.

A second embodiment may provide an optical unit facing a display unit and including: a first substrate on the display unit; a first electrode on the first substrate; a liquid crystal layer on the first electrode and configured to be responsive to a vertical electric field or a horizontal electric field; a second electrode on the liquid crystal layer; an insulation layer on the second electrode; a third electrode on the insulation layer; and a second substrate on the third electrode.

DETAILED DESCRIPTION

Figure 1:
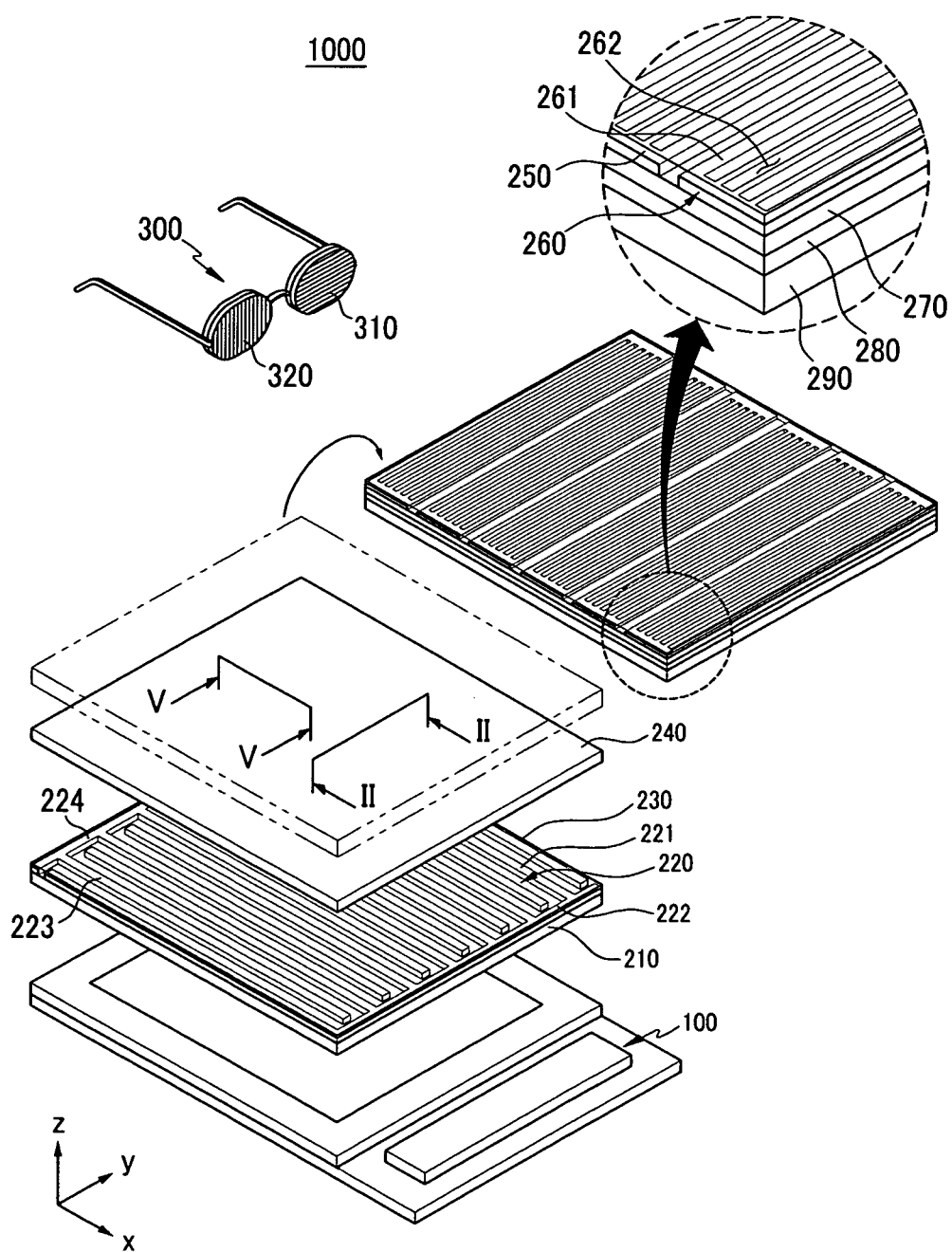
FIG. 1 is a perspective view of a display device according to the first exemplary embodiment.

Example embodiments will now be described more fully hereinafter with reference to the accompanying drawings; however, they may be embodied in different forms and should not be construed as limited to the embodiments set forth herein.

In addition, parts not related to the description are omitted for clear description, and like reference numerals designate like elements and similar constituent elements throughout the specification.

Further, constituent elements having the same configurations in the exemplary embodiments are described in a first exemplary embodiment using like reference numerals, and only configurations different from those in the first exemplary embodiment will be described in the other exemplary embodiments.

Further, since sizes and thicknesses of constituent members shown in the accompanying drawings are arbitrarily given for better understanding and ease of description, present embodiments are not limited to the illustrated sizes and thicknesses.

In the drawings, the thickness of layers, films, panels, regions, etc., are exaggerated for clarity. In the drawings, the thickness of layers, films, panels, regions, etc., are exaggerated for convenience of description. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, "on" implies being positioned above or below a target element and does not imply being necessarily positioned on the top on the basis of a gravity direction.

A display device 1000 according to the first exemplary embodiment will be described with reference to FIG. 1 to FIG. 7.

FIG. 1 is a perspective view of a display device according to the first exemplary embodiment. For better understanding and ease of description, FIG. 1 shows the second substrate of an optical unit that is rotated 180 degrees according to an induced line for the inside of the second substrate of the optical unit to be displayed.

As shown in FIG. 1, a display device 1000 according to the first exemplary embodiment selectively display one image of a 3D image of a non-spectacles scheme, and a 3D image and a 2D image of a spectacles scheme, and includes a display unit 100, an optical unit 200, and polarizing spectacles 300. Here, the polarizing spectacles 300 are used when the display device 1000 displays the 3D image of the spectacles scheme, and is not used when the display device 1000 displays the 3D image of the non-spectacles scheme.

The display unit 100 displays the image, and may be an organic light emitting diode (OLED) display, a liquid crystal display (LCD), or a plasma display panel (PDP).

The display unit 100 displays a left-eye image and a right-eye image in order to allow a user to recognize the 3D image, or selectively displays a both-eye image in order to allow the user to recognize the 2D image.

When the display unit 100 is a liquid crystal display (LCD), the display unit 100 includes a display panel including both substrates and liquid crystals positioned between the substrates, and a backlight unit irradiating light to the display panel. Both substrates may include a substrate body made of glass, plastic, or metal, and a metal pattern formed on the substrate body and used as an electrode and a color filter. A longitudinal or transverse electric field is formed in space between the substrates, such that a liquid crystal layer serves as a shutter in accordance with a longitudinal or transverse electric field. Therefore, the display unit 100 selectively displays the 2D image or the 3D image. When the display unit 100 is an organic light emitting diode display, the display unit 100 includes both substrates and an organic light emitting diode positioned between the substrates. The organic light emitting diode is a self-light emitting diode, and an organic emission layer included in the organic light emitting diode emits light to selectively display the 2D image or the 3D image. When the display unit 100 is a plasma display panel (PDP), the display unit 100 includes both substrates forming a barrier rib and plasma positioned inside the substrates and the barrier rib. The plasma emits light for the display unit 100 to selectively display the 2D image or the 3D image.

Figure 2:
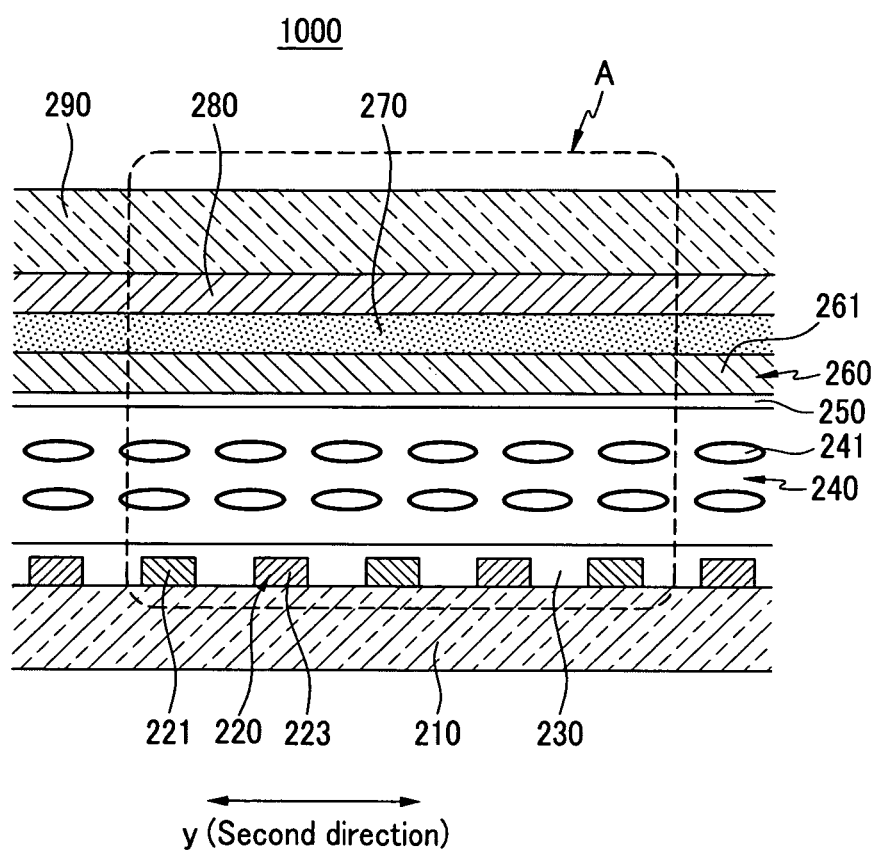
FIG. 2 is a cross-sectional view taken along the line II-II of FIG. 1.

FIG. 2 is a cross-sectional view taken along the line II-II of FIG. 1.

As shown in FIG. 1 and FIG. 2, an optical unit 200 optically converts the image in order to allow a user to recognize the image displayed by the display unit 100 as the 3D image, and includes a first substrate 210, a first electrode 220, a first alignment layer 230, a liquid crystal layer 240, a second alignment layer 250, a second electrode 260, an insulation layer 270, a third electrode 280, and a second substrate 290.

The first substrate 210 is formed as a transparent substrate made of glass or plastic, and may have flexibility. The first electrode 220 is positioned on the first substrate 210.

The first electrode 220 includes a transparent conducting material such as indium tin oxide (ITO) or indium zinc oxide (IZO), is formed on the first substrate 210, and includes a first sub-electrode 221, a first connection electrode 222, a second sub-electrode 223, and a second connection electrode 224.

A plurality of first sub-electrodes 221 extend in a first direction of an x-axis direction shown in FIG. 1, and are separated from each other. The plurality of first sub-electrodes 221 having a stripe shape extend in the first direction and are separated from each other.

The first connection electrode 222 connects ends of the plurality of the first sub-electrodes 221, so if the first connection electrode 222 is applied with a voltage, the plurality of first sub-electrodes 221 connected to the first connection electrode 222 are also applied with the voltage.

The second sub-electrode 223 is disposed between neighboring first sub-electrodes 221 among the plurality of the first sub-electrodes 221, and the plurality of second sub-electrodes 223 extend in the first direction and are separated from each other. Thus, a plurality of the second sub-electrodes 223 and a plurality of the first sub-electrodes 221 are alternately disposed.

The second connection electrode 224 is separated from the first connection electrode 222 via a plurality of the first sub-electrodes 221 and a plurality of the second sub-electrode 223 disposed therebetween, and connects the ends of a plurality of the second sub-electrodes 223. If the second connection electrode 224 is applied with a voltage, a plurality of the second sub-electrodes 223 connected to the second connection electrode 224 are also applied with the voltage.

The first alignment layer 230 is formed on the first electrode 220.

The first alignment layer 230 is formed on the first substrate 210, is positioned between the first electrode 220 and the liquid crystal layer 240, and covers the first electrode 220. The first alignment layer 230 is rubbed in a y-axis direction shown in FIG. 1, as the second direction, intersecting the first direction for aligning a liquid crystal 241 included in the liquid crystal layer 240. The first alignment layer 230 is in contact with the liquid crystal layer 240, and the liquid crystal 241 included in the liquid crystal layer 240 is aligned by the first alignment layer 230 such that the long axis thereof is arranged parallel to the second direction in a state that the liquid crystal layer 240 is not applied with an electric field. The liquid crystal layer 240 is positioned on the first alignment layer 230.

The liquid crystal layer 240 is positioned between the first electrode 220 and the second electrode 260, and includes the liquid crystal 241. A vertical electric field or a horizontal electric field is selectively formed to the liquid crystal layer 240 by the voltage that is selectively applied to the first electrode 220, the second electrode 260, and the third electrode 280, and the liquid crystal 241 is tilted according to the vertical electric field or the horizontal electric field. Thus, the long axis of the liquid crystal 241 is rearranged. The display unit 100 displays at least one of the left-eye image and the right-eye image as the image. Thus, the display device 1000 displays the 3D image. When the electric field is not applied to the liquid crystal layer 240, the display unit 100 displays a both-eye image as the image. Thus, the display device 1000 displays the 2D image. The state that the liquid crystal 241 is rearranged according to the vertical electric field or the horizontal electric field formed to the liquid crystal layer 240 and the display of the image for the display unit 100 according thereto will be described later. The second alignment layer 250 is positioned on the liquid crystal layer 240.

The second alignment layer 250 is formed on the second substrate 290, being disposed between the liquid crystal layer 240 and the second electrode 260, and covers the second electrode 260. The second alignment layer 250 is rubbed in the second direction as the y-axis direction shown in FIG. 1, intersecting the first direction for the alignment of the liquid crystal 241 included in the liquid crystal layer 240. The second alignment layer 250 is in contact with the liquid crystal layer 240, and the liquid crystal 241, in the liquid crystal layer 240, is aligned by the second alignment layer 250 in the state that the electric field is not applied to the liquid crystal layer 240 such that the long axis thereof is arranged parallel to the second direction. The second electrode 260 is positioned on the second alignment layer 250.

The second electrode 260 includes the transparent conducting material, i.e., ITO or IZO, is formed on the second substrate 290, and includes a third sub-electrode 261.

A plurality of third sub-electrodes 261 extend in the second direction as the y-axis direction of FIG. 1 and are separated from each other. The plurality of third sub-electrodes 261 include a plurality of openings 262, respectively, extending in the second direction with a stripe shape and separated from each other. The plurality of the third sub-electrodes 261 include a plurality of sub-electrodes, respectively, disposed between the neighboring openings 262.

Each elongation direction of the first sub-electrode 221 included in the first electrode 220 and the third sub-electrode 261 of the second sub-electrode 223 and the second electrode 260 is mutually intersected.

The insulation layer 270 is formed on the second electrode 260.

The insulation layer 270 is formed on the second electrode 260 and is disposed between the second electrode 260 and the third electrode 280. The insulation layer 270 prevents shorting between the second electrode 260 and the third electrode 280.

The third electrode 280 is formed on the insulation layer 270 with a plate shape, and is disposed between the insulation layer 270 and the second substrate 290. The third electrode 280 includes the transparent conducting material, i.e., ITO or IZO.

The second substrate 290 may be a transparent substrate, i.e., glass or plastic, like the first substrate 210, and may have flexibility.

As described above, the polarizing spectacles 300 may face the optical unit 200. However, the polarizing spectacles 300 are only used when the display device 1000 displays the 3D image of the spectacles scheme.

The polarizing spectacles 300 face the optical unit 200 and include a left eye polarizing plate 310, having a first optical axis parallel to the first direction as the x-axis of FIG. 1, and a right eye polarizing plate 320, having a second optical axis parallel to the second direction as the y-axis shown in FIG. 1. The left eye polarizing plate 310 of the polarizing spectacles 300 may have the second optical axis, and the right eye polarizing plate 320 may have the first optical axis.

The display device 1000 according to the first exemplary embodiment displays the 3D image of the non-spectacles scheme, and the 3D image and the 2D image of the spectacles scheme. A display of the 3D image of the non-spectacles scheme through the display device 1000 according to the first exemplary embodiment will be described with reference to FIG. 3 and FIG. 4. The polarizing spectacles 300 are not used when the display device 1000 displays the 3D image of the non-spectacles scheme.

When the display device 1000 according to the first exemplary embodiment displays the 3D image of the non-spectacles scheme, the control of the optical unit 200 will be described.

Figure 3:
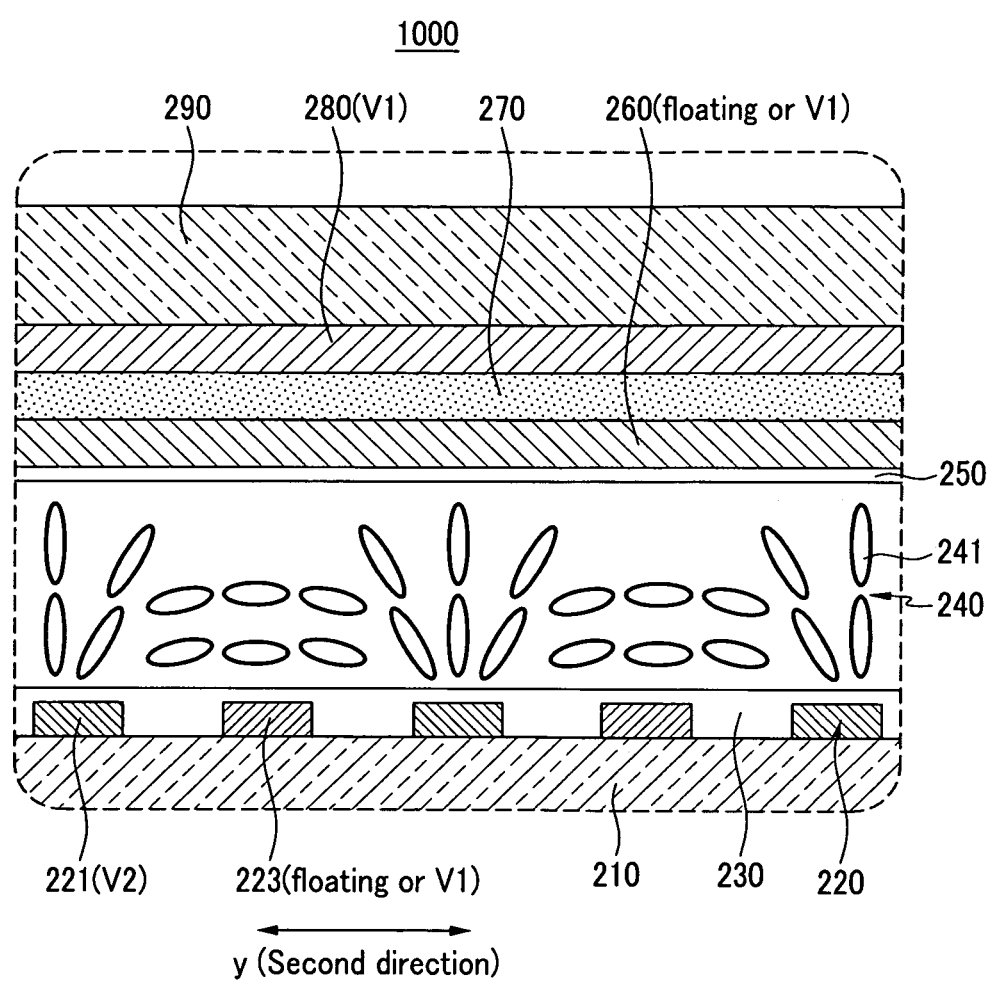
FIG. 3 is an enlarged view of a portion A of FIG. 2 where a vertical electric field is formed at a liquid crystal layer.

FIG. 3 is an enlarged view of a portion A of FIG. 2, where a vertical electric field is formed at a liquid crystal layer.

As shown in FIG. 3, a vertical electric field is formed to the liquid crystal layer 240 by different voltages that are respectively applied to the first electrode 220 and the third electrode 280, and the liquid crystal 241 is arranged with a lens shape by the vertical electric field. If the third electrode 280 of the plate shape is applied with the first voltage V1, the first sub-electrode 221 of the first electrode 220 is applied with the second voltage V2, larger than the first voltage V1. The second sub-electrode 223 and the second electrode 260 are not applied with the voltage and are floated. Thus, the vertical electric field of the lens shape is formed to the liquid crystal layer 240 by the different voltages that are applied to the third electrode 280 and the first sub-electrode 221 of the first electrode 220, and the liquid crystal 241 is rearranged according to the vertical electric field of the lens shape such that the long axis thereof is tilted like the lens shape shown in FIG. 3.

In the state that the first sub-electrode 221 of the first electrode 220 is applied with the second voltage V2, the third electrode 280 is applied with the first voltage V1 and the second electrode 260 and the second sub-electrode 223 of the first electrode 220 are applied with the first voltage V1, so the vertical electric field of the lens shape may be formed to the liquid crystal layer 240, the liquid crystal 241 may be arranged with the lens shape by the vertical electric field.

In the state that the third electrode 280 is applied with the first voltage V1, the first sub-electrode 221 of the first electrode 220 is applied with the second voltage V2 and the second electrode 260 and the second sub-electrode 223 of the first electrode 220 are selectively applied with the first voltage V1, the vertical electric field formed to the liquid crystal layer 240 may be minutely controlled. As a result, the lens shape in which the liquid crystal 241 included in the liquid crystal layer 240 is arranged may be minutely controlled.

A display operation of a display unit 100, when the liquid crystal 241 of the liquid crystal layer 240 is arranged with the lens shape, will be described.

Figure 4:
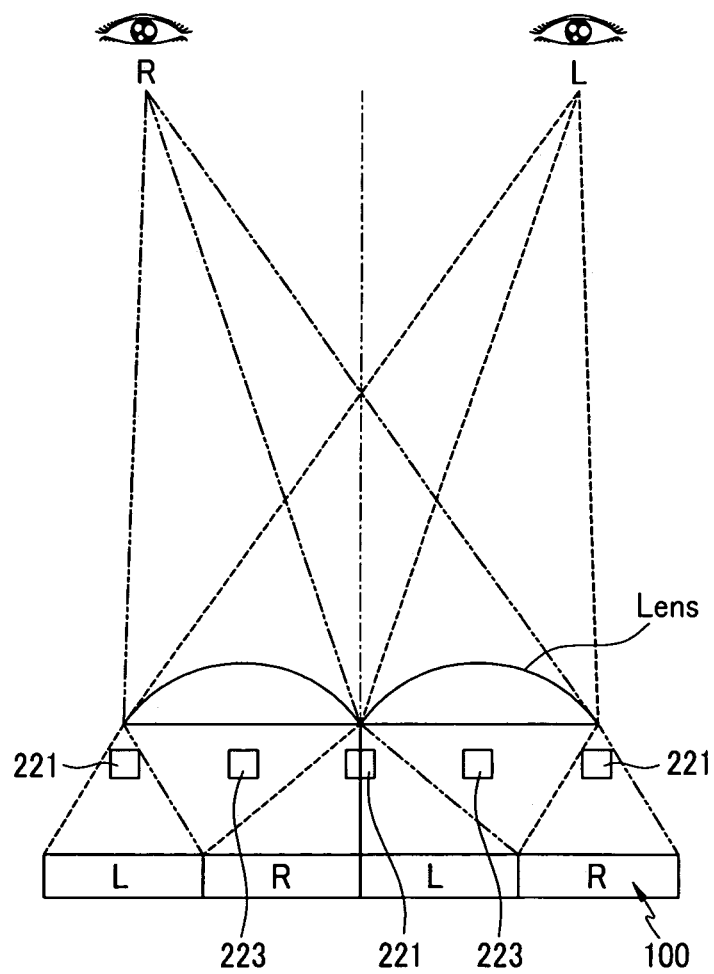
FIG. 4 is a view to explain recognition of a 3D image through a non-spectacles scheme in a display device according to the first exemplary embodiment.

FIG. 4 is a view to explain recognition of a 3D image through a non-spectacles scheme in a display device, according to the first exemplary embodiment.

As shown in FIG. 4, when the liquid crystal 241 of the liquid crystal layer 240 of the optical unit 200 is arranged with the lens shape between the neighboring first sub-electrodes 221, the display unit 100 displays the left-eye image L and the right-eye image R as the image between the neighboring first sub-electrodes 221. The optical unit 200 serves as a viewing zone separation unit that separates a left-eye image L and a right-eye image R that are displayed by the display unit 100 to be recognized in a left eye and a right eye, respectively.

The liquid crystal 241 is arranged with the lens shape between the neighboring first sub-electrodes 221 by the vertical electric field formed at the liquid crystal layer 240 such that a plurality of lens are formed in the liquid crystal layer 240. When the left-eye image L and the right-eye image R are displayed in the display unit 100 at positions corresponding to each of the plurality of lenses of the liquid crystal layer 240, the left-eye image L is refracted through the liquid crystal layer 240 to be recognized by a user's left eye and the right-eye image R is refracted through the liquid crystal layer 240 to be recognized by a user's right eye. Thus, a user recognizes an image from the display 1000 as the 3D image by binocular disparity.

When the display unit 100 displays the both-eye image in the state that the electric field is formed at the liquid crystal layer 240 of the optical unit 200, the both-eye image displayed from the display unit 100 is recognized by both the user's eyes through the lens unit 200. This allows the user to recognize the 2D image from the display 1000.

The display device 1000 according to the first exemplary embodiment forms the vertical electric field to the liquid crystal layer 240 of the optical unit 200 to form a plurality of lens to the liquid crystal layer 240 such that a refractive degree of an image recognized by the user through the optical unit 200 from the display unit 100 can be controlled. Thus, the 3D image may be recognized to the user. The display device 1000 according to the first exemplary embodiment displays the 3D image of the non-spectacles scheme.

Display of the 3D image of the spectacles scheme through the display device 1000 according to the first exemplary embodiment will be described with reference to FIG. 5 to FIG. 7. When the display device 1000 displays the 3D image of the spectacles scheme, the polarizing spectacles 300 are used.

When the display device 1000 according to the first exemplary embodiment displays the 3D image of the spectacles scheme, the control of the optical unit 200 will be described.

Figure 5:
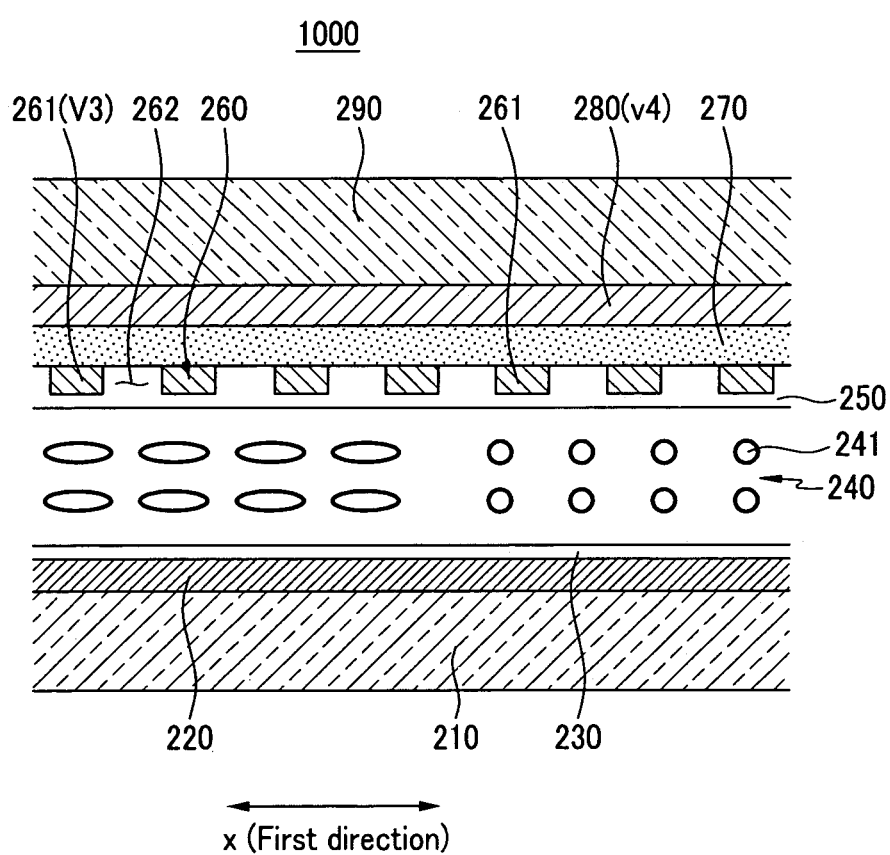
FIG. 5 is a cross-sectional view taken along the line V-V of FIG. 1 where a horizontal electric field is formed at a liquid crystal layer.

FIG. 5 is a cross-sectional view taken along the line V-V of FIG. 1 where a horizontal electric field is formed at the liquid crystal layer. FIG. 6 is a top view of the liquid crystal layer shown in FIG. 5.

Figure 6:
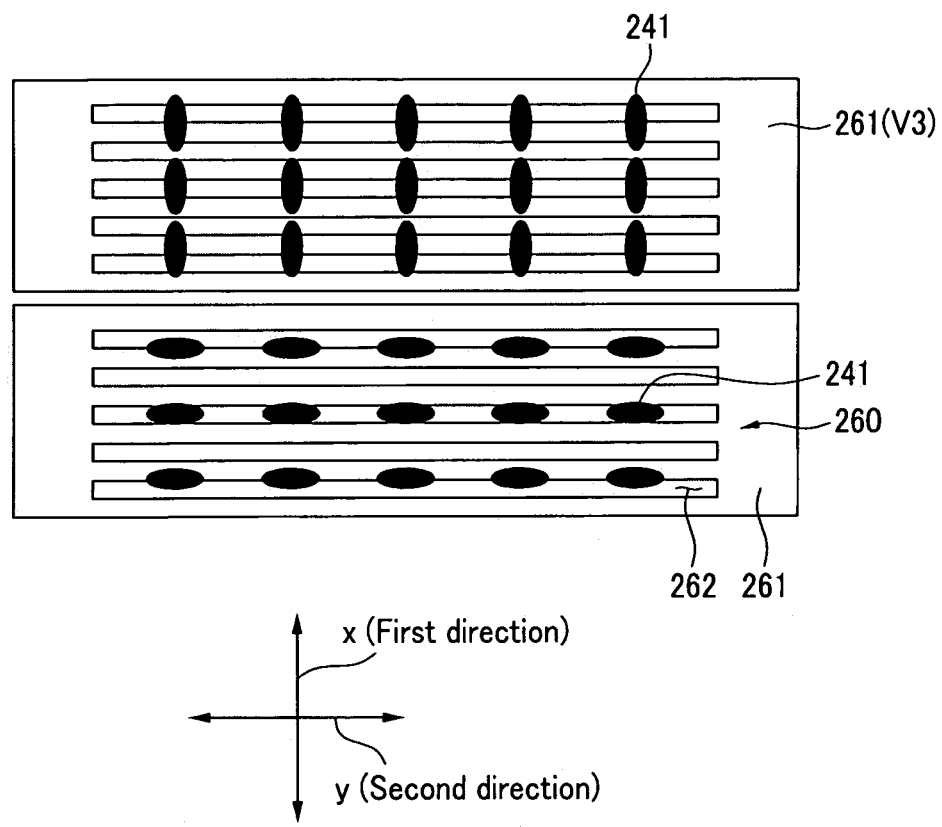
FIG. 6 is a top view of the liquid crystal layer shown in FIG. 5.

As shown in FIG. 5 and FIG. 6, the horizontal electric field is formed at the liquid crystal layer 240 by the same or different voltages respectively applied to the second electrode 260 and the third electrode 280 such that the long axis of the liquid crystal 241 is arranged in the direction parallel to the first direction as the x-axis by the horizontal electric field. If a third voltage V3 is sequentially applied from the third sub-electrode 261 adjacent to one end of the second substrate 290 among a plurality of the third sub-electrodes 261 to the third sub-electrode 261 adjacent to the other end of the second substrate, and the third electrode 280 is applied with a fourth voltage V4 that is the same as the third voltage V3 or not, the long axis of the first liquid crystal 241 corresponding to the third sub-electrode 261 to which the third voltage V3 is not applied is arranged parallel to the second direction as the y-axis that is the rubbing direction of the first alignment layer 230 and the second alignment layer 250. However, the long axis of the second liquid crystal 241 corresponding to the third sub-electrode 261 to which the third voltage V3 is applied is tilted according to the horizontal electric field, and the long axis of the second liquid crystal 241 is arranged in the direction parallel to the x-axis as the first direction. When a plurality of the third sub-electrodes 261 are sequentially applied with the third voltage V3, the long axis of the liquid crystal 241 corresponding to the third sub-electrode 261 applied with the third voltage V3 is arranged from the state parallel to the second direction into the state parallel to the first direction by the horizontal electric field.

The display state of the display unit 100 will be described when the long axis of the liquid crystal 241 of the liquid crystal layer 240 is sequentially arranged from the state parallel to the second direction into the state parallel to the first direction.

Figure 7:
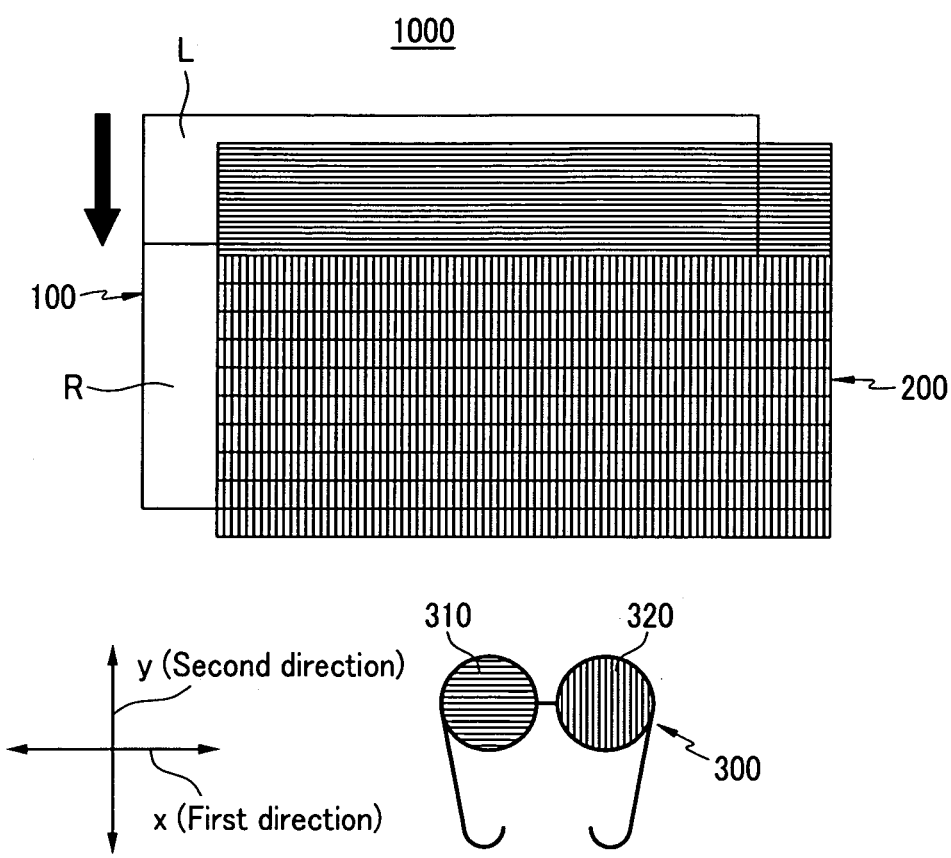
FIG. 7 is a view to explain recognition of a 3D image through a spectacles scheme in a display device according to the first exemplary embodiment.

FIG. 7 is a view to explain recognition of a 3D image through a spectacles scheme in a display device according to the first exemplary embodiment.

As shown in FIG. 7, when the long axis of the liquid crystal 241 of the liquid crystal layer 240 of the optical unit 200 is sequentially arranged corresponding to the third sub-electrode 261 applied with the third voltage V3 from the state parallel to the second direction into the state parallel to the first direction, the display unit 100 displays the left-eye image L as the image corresponding to the third sub-electrode 261 applied with the third voltage V3, and the right-eye image R as the image corresponding to the third sub-electrode 261 that is not applied with the third voltage V3 among the left-eye image L and the right-eye image R. The left-eye image L emitted from the display unit 100 is linearly polarized into an image having the optical axis parallel to the first direction while passing through the liquid crystal layer 240 corresponding to the region where the horizontal electric field is formed, and the right-eye image R emitted from the display unit 100 is linearly polarized into an image having the optical axis parallel to the second direction while passing through the liquid crystal layer 240 corresponding to the region where the horizontal electric field is not formed.

The user wearing the polarizing spectacles 300 recognizes the left-eye image L passing through the optical unit 200 and having the optical axis parallel to the first direction to the left eye through the left eye polarizing plate 310 having the first optical axis parallel to the first direction, and simultaneously recognizes the right-eye image R passing through the optical unit 200 and having the optical axis parallel to the second direction to the right eye through the right eye polarizing plate 320 having the second optical axis parallel to the second direction. Thus, the user recognizes the 3D image from the display device 1000. The optical unit 200 functions as a polarization switch unit, changing each optical axis of the left-eye image L and the right-eye image R that are displayed by the display unit 100, to be different from each other.

As an example, in the case in which the 3D image having a scan velocity of 60 Hz is displayed, when the left-eye image L or the right-eye image R is displayed at the display unit 100 with a scan velocity of 120 Hz and the optical unit 200 is synchronized thereto, the user recognizes the image having the 60 Hz scan velocity. The 60 Hz scan velocity may prevent the overall resolution from being deteriorated.

In the display device 1000 according to the first exemplary embodiment, the horizontal electric field is formed as the liquid crystal layer 240 of the optical unit 200 such that the original direction of the long axis of the liquid crystal 241 is arranged into the different direction. Thus, the optical axis of the image that is emitted from the display unit 100 and is recognized to the user through the optical unit 200 is controlled, and as a result the 3D image is may be recognized by the user through the polarizing spectacles 300. The display device 1000 according to the first exemplary embodiment displays the 3D image of the spectacles scheme.

As described above, the display device 1000 according to the first exemplary embodiment selectively applies the voltage to the first electrode 220, the second electrode 260, and the third electrode 280 to form the vertical electric field or the horizontal electric field to the liquid crystal layer 240 for forming the different arrangement of the liquid crystal 241. Thus, one display device 1000 selectively displays the 3D image of the spectacles scheme and the 3D image of the non-spectacles scheme. The display device 1000, capable of selecting the spectacles scheme or the non-spectacles scheme for the user, may be provided.

A display device 1002 according to the second exemplary embodiment will be described with reference to FIG. 8 to FIG. 10.

Figure 8:
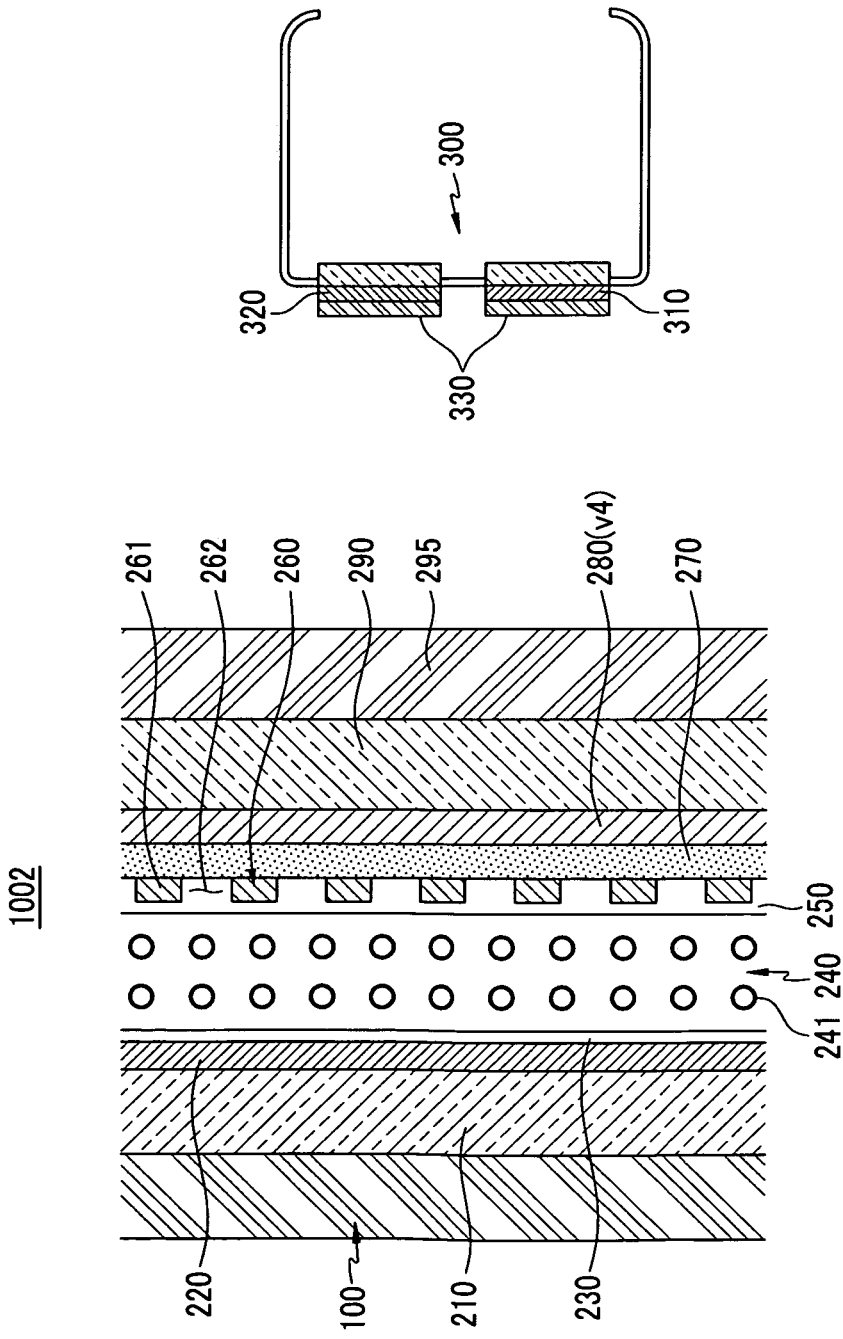
FIG. 8 is a cross-sectional view of a display device according to the second exemplary embodiment.

FIG. 8 is a cross-sectional view of a display device according to the second exemplary embodiment.

As shown in FIG. 8, an optical unit 200 optically converts the image in order to allow a user to recognize the image displayed by the display unit 100 as the 3D image, and includes a first substrate 210, a first electrode 220, a first alignment layer 230, a liquid crystal layer 240, a second alignment layer 250, a second electrode 260, an insulation layer 270, a third electrode 280, a second substrate 290, and a first retarder 295.

The first retarder 295 is positioned on the second substrate 290 and is a ¼ wavelength plate. The optical axis of the first retarder 295 is tilted by 45 degrees or 135 degrees compared with the first direction as the x-axis, and the left-eye image L and the right-eye image R that are emitted from the display unit 100 and are linearly polarized while passing through the liquid crystal layer 240 formed with the horizontal electric field are circularly polarized while passing through the first retarder 295. The image emitted from the display unit 100 and sequentially passing through the liquid crystal layer 240 and the first retarder 295 is circularly polarized. The image emitted from the display unit 100 and passing through the optical unit 200 has a circularly polarized optical axis.

The polarizing spectacles 300 further includes a second retarder 330 positioned on the left eye polarizing plate 310 and the right eye polarizing plate 320 and facing the first retarder 295.

The second retarder 330 is a ¼ wavelength plate, similar to the first retarder 295. The optical axis of the second retarder 330 is tilted by 45 degrees or 135 degrees compared with the left eye polarizing plate 310 and the right eye polarizing plate 320, and the image that is emitted from the display unit 100 and has a circularly polarized optical axis while passing through the optical unit 200 is linearly polarized while passing through the second retarder 330. The image emitted from the display unit 100 and having the circularly polarized optical axis through the optical unit 200 is again linearly polarized while passing through the second retarder 330, and the linearly polarized image is recognized by the left eye and the right eye of the user through the left eye polarizing plate 310 and the right eye polarizing plate 320.

A path of an image from the display unit 100 to the polarizing spectacles 300 will be described with reference to FIG. 9.

Figure 9:
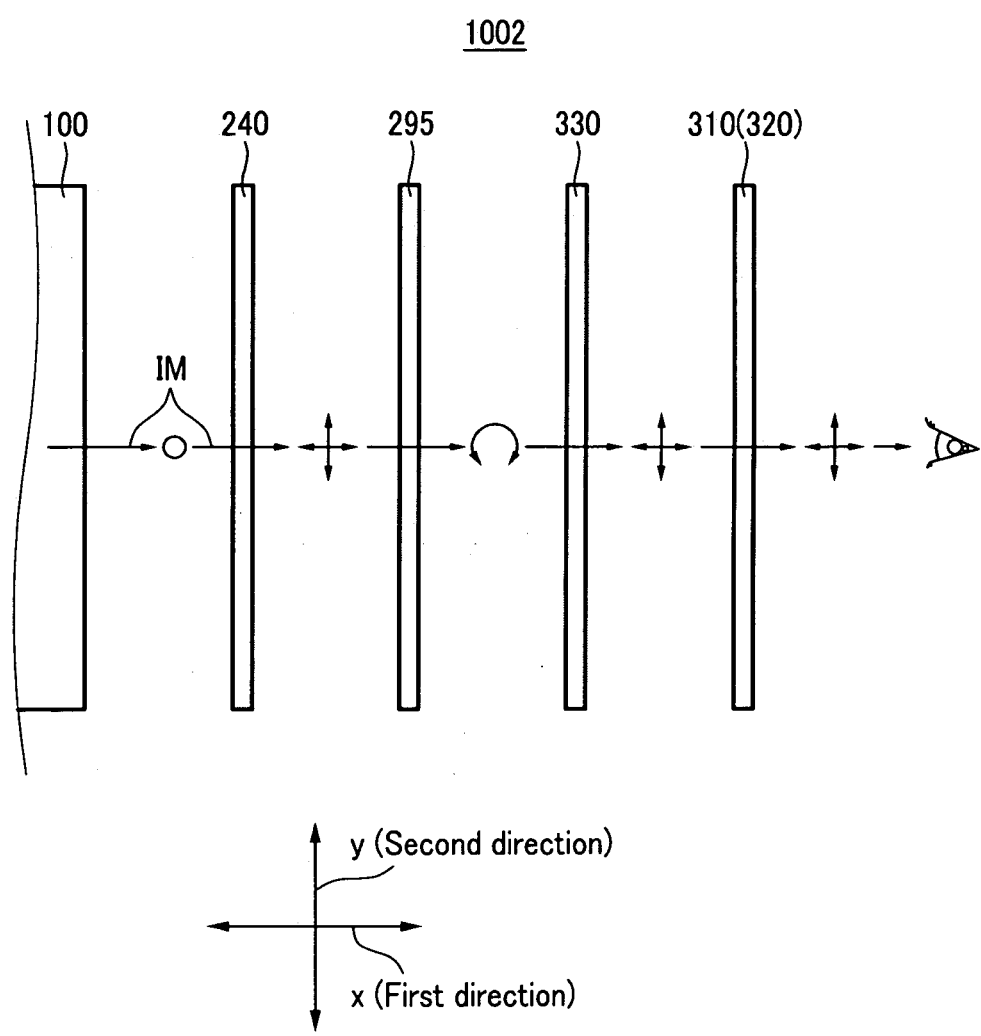
FIG. 9 is a view showing a path that an image emitted from a display unit is incident to polarizing spectacles in a display device according to the second exemplary embodiment.

FIG. 9 is a view showing a path through which an image emitted from a display unit is incident to polarizing spectacles in a display device, according to the second exemplary embodiment.

As shown in FIG. 9, the image IM emitted from the display unit 100 is linearly polarized while passing through the liquid crystal layer 240 formed with the horizontal electric field to have the optical axis parallel to the first direction or the second direction. The linearly polarized image IM is left-circularly polarized or right-circularly polarized, while again passing through the first retarder 295 as the ¼ wavelength plate.

The image IM that is left-circularly polarized or right-circularly polarized is linearly polarized to have the optical axis parallel to the first direction or the second direction while again passing through the second retarder 330 of the polarizing spectacles 300. The linearly polarized image IM is transmitted to the left eye polarizing plate 310 or the right eye polarizing plate 320, thereby being recognized by the left eye or the right eye of the user.

The linearly polarized image that is transmitted from the display unit 100 to the liquid crystal layer 240 is circularly polarized and is circularly polarized while passing through the first retarder 295 and the second retarder 330. The linearly polarized image is transmitted to the left eye polarizing plate 310 or the right eye polarizing plate 320 and is recognized by the left eye or the right eye of the user.

An effect of a display device 1002 according to the second exemplary embodiment will be described with reference to FIG. 10.

Figure 10:
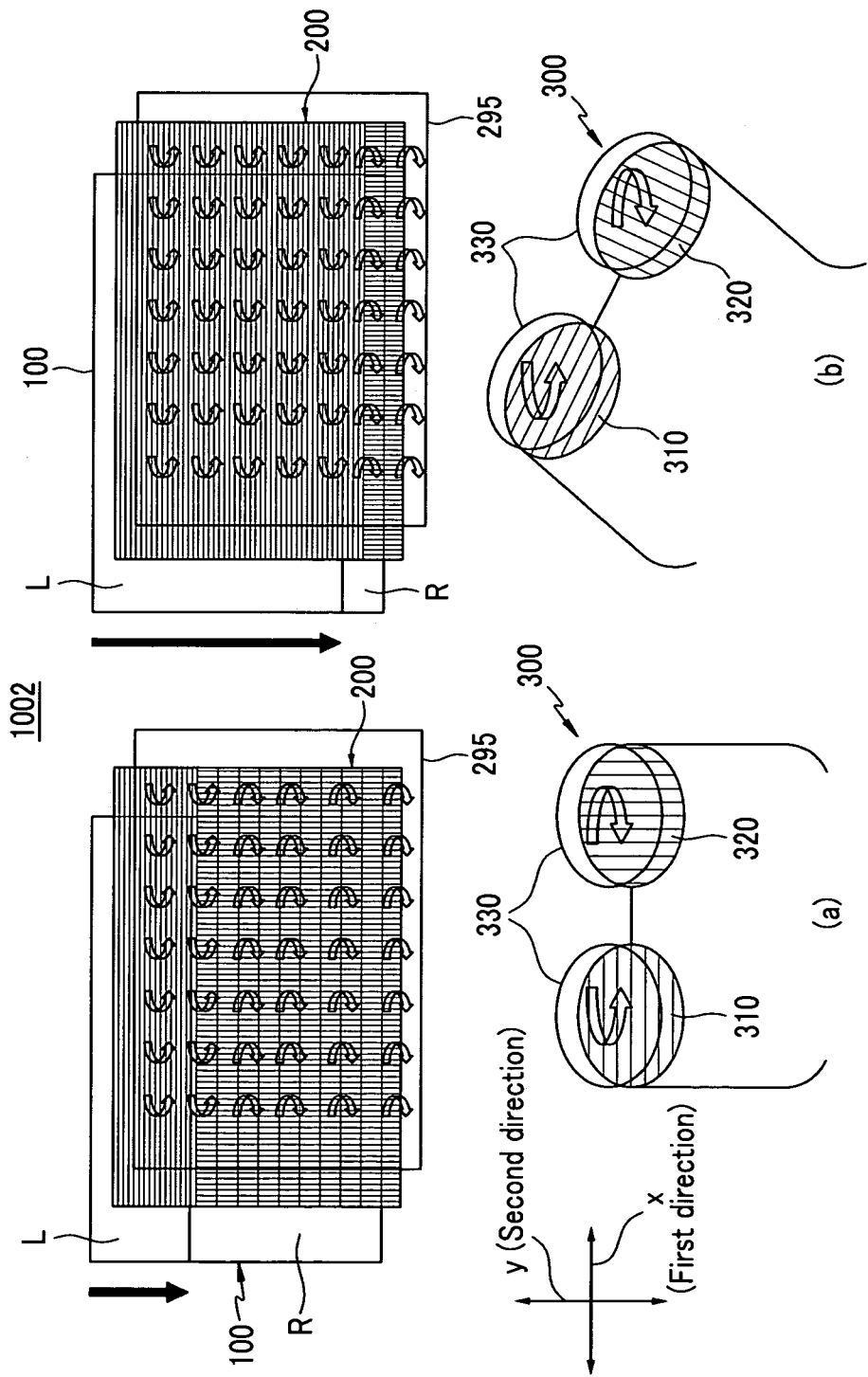
FIG. 10 is a view to explain an effect of a display device according to the second exemplary embodiment.

FIG. 10 is a view to explain an effect of a display device according to the second exemplary embodiment.

As shown in FIG. 10 (a) and (b), in the display device 1002 according to the second exemplary embodiment, although the polarizing spectacles 300 face the front side of the display unit 100 and optical unit 200 and the polarizing spectacles 300 are tilted with respect to the display unit 100 and the optical unit 200, the image emitted from the display unit 100 and passing though the optical unit 200 is circularly polarized, and the circularly polarized image is incident to the polarizing spectacles 300 in the circularly polarized state such that a difference is not generated between the optical axis of the image emitted from the display unit 100 and passing through the optical unit 200 and the optical axis of the left eye polarizing plate 310 and the right eye polarizing plate 320 of the polarizing spectacles 300. The linearly polarized image emitted from the display unit 100 and passing through the optical unit 200 is circularly polarized while passing through the first retarder 295 and then is incident to the polarizing spectacles 300, and the image that is circularly polarized and incident to the polarizing spectacles 300 is again linearly polarized while passing through the second retarder 330 and is recognized by the left eye or the right eye of the user through the left eye polarizing plate 310 or the right eye polarizing plate 320, such that the luminance of the image emitted from the display unit 100 and passing through the optical unit 200 is not deteriorated until the image passes through the polarizing spectacles 300.

As described above, in the display device 1002 according to the second exemplary embodiment, although the polarizing spectacles 300 are inclined for the display unit 100 and the optical unit 200, when the image emitted from the display unit 100 and passing through the optical unit 200 is incident to the polarizing spectacles 300, the luminance is not deteriorated.

A display device 1003 according to the third exemplary embodiment will be described with reference to FIG. 11 and FIG. 12.

Figure 11:
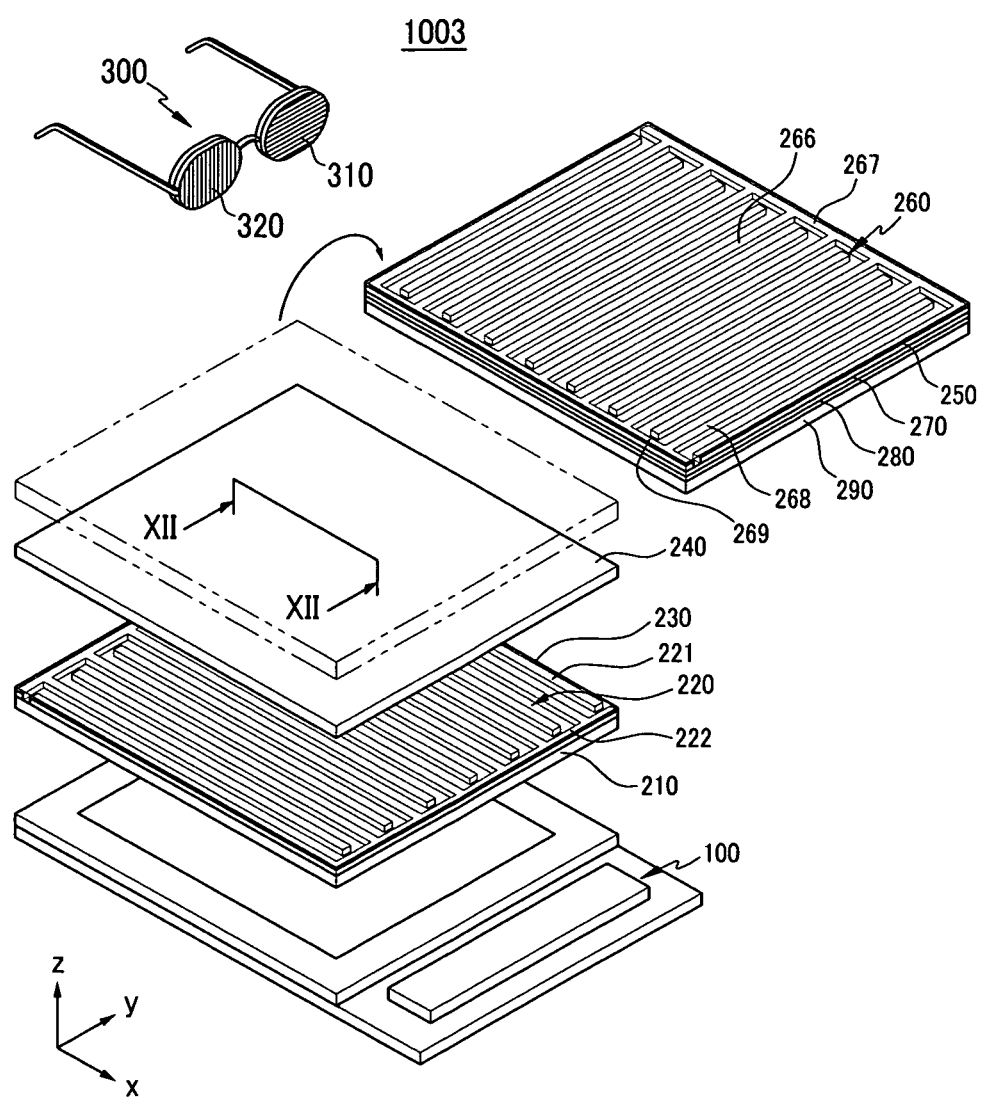
FIG. 11 is a perspective view of a display device according to the third exemplary embodiment.

FIG. 11 is a perspective view of a display device according to the third exemplary embodiment. For better understanding and ease of description, the second substrate of the optical unit is rotated by 180 degrees according to an induced line in FIG. 11 for the inside of the second substrate of the optical unit to be shown. FIG. 12 is a cross-sectional view taken along the line XII-XII of FIG. 11.

Figure 12:
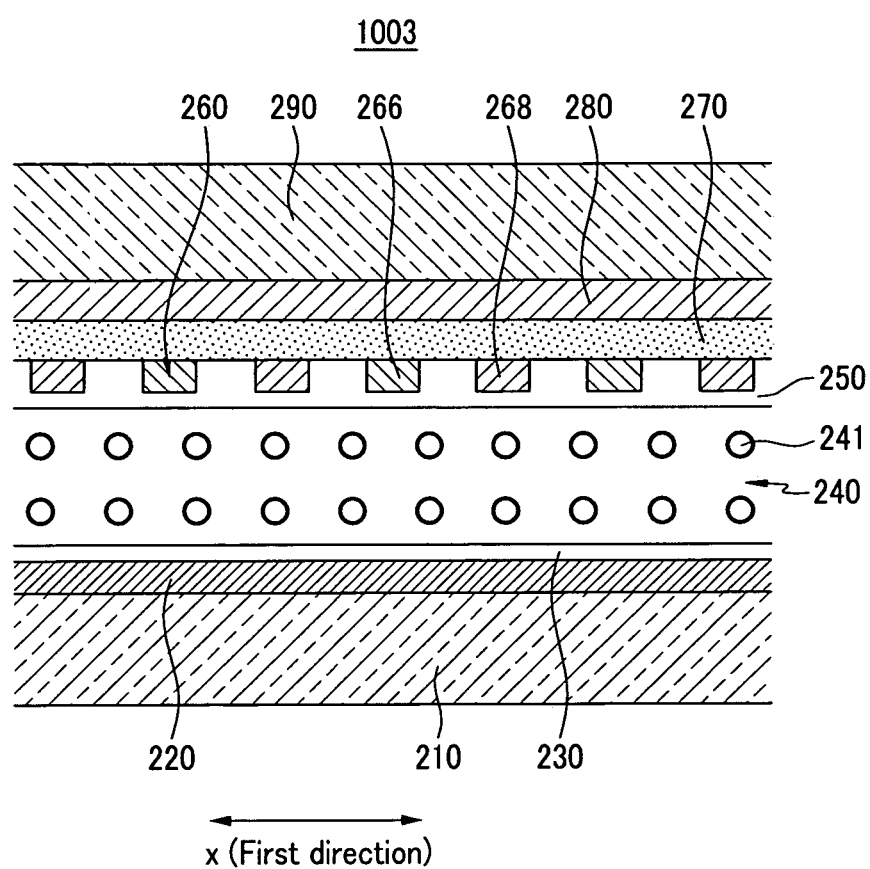
FIG. 12 is a cross-sectional view taken along the line XII-XII of FIG. 11.

As shown in FIG. 11 and FIG. 12, an optical unit 200 of the display device 1003 according to the third exemplary embodiment optically converts the image in order to allow a user to recognize the image displayed by the display unit 100 as the 3D image, and includes a first substrate 210, a first electrode 220, a first alignment layer 230, a liquid crystal layer 240, a second alignment layer 250, a second electrode 260, an insulation layer 270, a third electrode 280, and a second substrate 290.

The second electrode 260 includes the transparent conducting material, i.e., ITO or IZO, is formed on the second substrate 290, and includes a fourth sub-electrode 266, a third connection electrode 267, a fifth sub-electrode 268, and a fourth connection electrode 269.

A plurality of the fourth sub-electrodes 266 extend in the second direction as the y-axis direction and are separated from each other. The plurality of fourth sub-electrodes 266 are separated from each other in the stripe state and extend in the second direction.

The third connection electrode 267 connects the ends of the plurality of fourth sub-electrodes 266. If the third connection electrode 267 is applied with the voltage, the plurality of fourth sub-electrodes 266 connected to the third connection electrode 267 are applied with the voltage.

The fifth sub-electrode 268 is positioned between the neighboring fourth sub-electrodes 266 among the plurality of fourth sub-electrodes 266 and the plurality of fifth sub-electrode 268 are separated from each other and extend in the second direction. Thus, the plurality of fifth sub-electrodes 268 and the plurality of fourth sub-electrodes 266 are alternately disposed.

The fourth connection electrodes 269 are separated from the third connection electrode 267 via the plurality of fourth sub-electrode 266 and the plurality of fifth sub-electrodes 268 disposed therebetween, and connect the ends of the plurality of the fifth sub-electrodes 268. If the fourth connection electrode 269 is applied with the voltage, the plurality of fifth sub-electrodes 268 connected to the fourth connection electrode 269 are applied with the voltage.

A display operation for the 3D image of the spectacles scheme of a display unit 10003 according to the third exemplary embodiment will be described.

When the display device 1003 according to the third exemplary embodiment displays the 3D image of the spectacles scheme, the control of the optical unit 200 will be described.

The horizontal electric field is formed by the voltage applied to the second electrode 260 in the liquid crystal layer 240, and the long axis of the liquid crystal 241 is arranged in the direction parallel to the first direction as the x-axis by the horizontal electric field. If a plurality of the fourth sub-electrodes 266 and a plurality of the fifth sub-electrodes 268 are equally applied the fifth voltage, or a plurality of the fourth sub-electrodes 266 are applied with the fifth voltage and a plurality of the fifth sub-electrodes 268 are applied with the sixth voltage different from the fifth voltage such that the horizontal electric field is formed in the liquid crystal layer 240, the long axis of the liquid crystal 241 of the liquid crystal layer 240 is tilted according to the horizontal electric field such that the long axis of the liquid crystal 241 is arranged in the direction parallel to the first direction as the x-axis. When the second electrode 260 is applied with the voltage, the long axis of the liquid crystal 241 of the liquid crystal layer 240 is arranged from the state parallel to the second direction by the horizontal electric field into the state parallel to the first direction. The display unit 100 displays the left-eye image L among the left-eye image L and the right-eye image R. When the second electrode 260 is not applied with the voltage such that the long axis of the liquid crystal 241 of the liquid crystal layer 240 is parallel to the second direction, the display unit 100 displays the right-eye image R among the left-eye image L and the right-eye image R.

When the second electrode 260 is applied with the voltage such that the horizontal electric field is formed in the liquid crystal layer 240, the left-eye image L emitted from the display unit 100 is linearly polarized into the image having the optical axis parallel to the first direction while passing through the liquid crystal layer 240. When the voltage is applied to the second electrode 260 such that the horizontal electric field is not formed at the liquid crystal layer 240, the right-eye image R emitted from the display unit 100 is linearly polarized into the image having the optical axis having the second direction while passing through the liquid crystal layer 240.

The user wearing the polarizing spectacles 300 recognizes the left-eye image L passing through the optical unit 200 and having the optical axis parallel to the first direction to the left eye through the left eye polarizing plate 310 having the first optical axis parallel to the first direction, and simultaneously recognizes the right-eye image R passing through the optical unit 200 and having the optical axis parallel to the second direction to the right eye through the right eye polarizing plate 320 having the second optical axis parallel to the second direction. Thus, the user recognizes the 3D image from the display device 1000. The optical unit 200 functions as a polarization switch unit changing each optical axis of the left-eye image L and the right-eye image R that are displayed by the display unit 100 to be different from each other.

The display device 1003 according to the third exemplary embodiment selectively applies the voltage to the first electrode 220, the second electrode 260, and the third electrode 280 to form the vertical electric field or the horizontal electric field to the liquid crystal layer 240 for forming the different arrangement of the liquid crystal 241. Thus, one display device 1003 selectively displays the 3D image of the spectacles scheme and the 3D image of the non-spectacles scheme. The display device 1003 is capable of selecting the spectacles scheme or the non-spectacles scheme for the user.

By way of summation and review, a spectacles scheme alone suffers from the disadvantage that wearing spectacles is inconvenient. And yet, the non-spectacles scheme alone, which directly divides the images from the display, may result in inferior resolution, and the viewing angle may be narrow.

According to present embodiments, an optical unit capable of selecting the spectacles scheme and the non-spectacles scheme and a display device including the same are provided.

Exemplary embodiments have been disclosed herein, and although specific terms are employed, they are used and are to be interpreted in a generic and descriptive sense only and not for purpose of limitation.

What is claimed is:

1. A display device, comprising:
a display unit, displaying an image; and
an optical unit including:
a first substrate on the display unit,
a first electrode on the first substrate,
a liquid crystal layer on the first electrode and configured to be responsive to a vertical electric field or a horizontal electric field,
a second electrode on the liquid crystal layer,
an insulation layer on the second electrode,
a third electrode on the insulation layer, and
a second substrate on the third electrode,
wherein, when the liquid crystal layer is responsive to the vertical electric field, the optical unit is configured to transmit left and right eye images with a same polarization axis, and when the liquid crystal layer is responsive to the horizontal electric field, the optical unit is configured to transmit left and right eye images with different polarization axes.

2. The display device as claimed in claim 1, wherein the first electrode includes:
a plurality of first sub-electrodes separated from each other and extending in a first direction,
a first connection electrode connecting ends of the plurality of first sub-electrodes,
a plurality of second sub-electrodes between neighboring first sub-electrodes of the plurality of first sub-electrodes, the second sub-electrodes separated from each other and extending in the first direction, and
a second connection electrode being separated from the first connection electrode via a second sub-electrode of the plurality of second sub-electrodes, the second sub-electrode being interposed between the second connection electrode and the first connection electrode, and connecting ends of the plurality of second sub-electrodes.

3. The display device as claimed in claim 2, wherein:
the third electrode has a plate shape.

4. The display device as claimed in claim 3, wherein:
the liquid crystal layer is configured to be responsive to the vertical electric field.

5. The display device as claimed in claim 4, further comprising a voltage source configured to apply:
a first voltage to the second electrode, to the third electrode, and to a second sub-electrode of the plurality of second sub-electrodes, the second and third electrodes being on a same side of the liquid crystal layer, and
a second voltage greater than the first voltage to a first sub-electrode of the plurality of first sub-electrodes, the first and second sub-electrodes being on an opposite side of the liquid crystal layer relative to the second and third electrodes.

6. The display device as claimed in claim 5, wherein:
the liquid crystal layer includes a liquid crystal,
the liquid crystal corresponds to the neighboring first sub-electrodes and has a lens shape, and
the display unit is configured to display the left-eye image and the right-eye image as an image between the neighboring first sub-electrodes.

7. The display device as claimed in claim 3, wherein:
the liquid crystal layer is configured to be responsive to the horizontal electric field.

8. The display device as claimed in claim 7, wherein the optical unit further includes an alignment layer rubbed in a second direction intersecting the first direction, the alignment layer being positioned in at least one of:
between the first electrode and the liquid crystal layer and between the second electrode and the liquid crystal layer.

9. The display device as claimed in claim 8, wherein the second electrode includes a plurality of third sub-electrodes separated from each other and extending in the second direction.

10. The display device as claimed in claim 9, wherein the plurality of third sub-electrodes includes a plurality of openings separated from and extending in the second direction.

11. The display device as claimed in claim 10, further comprising a voltage source configured to apply:
a third voltage sequentially to the third sub-electrodes, the third voltage being applied sequentially from one of the third sub-electrodes, which third sub-electrode is adjacent to one end of the second substrate, to another third sub-electrode of another end of the second substrate of the plurality of third sub-electrodes, and
a fourth voltage to the third electrode.

12. The display device as claimed in claim 11, wherein the liquid crystal layer includes a liquid crystal,
the liquid crystal corresponds to the third sub-electrode applied with the third voltage, the liquid crystal being arranged to have a long axis thereof aligned in a direction parallel to the first direction, and the display unit is configured to display a combined image of the left-eye image and the right-eye image as an image corresponding to the third sub-electrode applied with the third voltage.

13. The display device as claimed in claim 8, wherein:
the second electrode includes:
a plurality of fourth sub-electrodes separated from each other and extending in the second direction,
a third connection electrode connecting the ends of the plurality of fourth sub-electrodes,
a plurality of fifth sub-electrodes between neighboring fourth sub-electrodes of the plurality of fourth sub-electrodes, the fifth sub-electrodes being separated from each other and extending in the second direction, and
a fourth connection electrode separated from the third connection electrode via a fifth sub-electrode interposed therebetween and connecting ends of the plurality of fifth sub-electrodes.

14. The display device as claimed in claim 13, further comprising a voltage source configured to apply a fifth voltage to a fourth sub-electrode of the plurality of fourth sub-electrodes and to a fifth sub-electrode of the plurality of fifth sub-electrodes.

15. The display device as claimed in claim 14, wherein:
the liquid crystal layer includes a liquid crystal,
the liquid crystal corresponds to the fourth sub-electrode and the fifth sub-electrode applied with the fifth voltage, the liquid crystal being arranged such that a long axis thereof is arranged in a direction parallel to the first direction, and
the display unit is configured to display a combined image of the left-eye image and the right-eye image as an image.

16. The display device as claimed in claim 8, further comprising:
polarizing spectacles facing the optical unit and including
a left eye polarizing plate having one optical axis among a first optical axis parallel to the first direction and a second optical axis parallel to the second direction, and
a right eye polarizing plate having the other optical axis among the first optical axis and the second optical axis.

17. The display device as claimed in claim 16, wherein:
the optical unit further includes a first retarder on the second substrate, and
the polarizing spectacles further include a second retarder on the left eye polarizing plate and the right eye polarizing plate and facing the first retarder.

18. The display device as claimed in claim 16, wherein:
the first retarder and the second retarder are ¼ wavelength plates.

19. The display device as claimed in claim 1, further comprising polarizing spectacles, the polarizing spectacles being configured to transmit an image only when the liquid crystal layer is responsive to the horizontal electric field.

20. An optical unit facing a display unit, comprising:
a first substrate on the display unit;
a first electrode on the first substrate;
a liquid crystal layer on the first electrode and configured to be responsive to a vertical electric field or a horizontal electric field, the liquid crystal layer including a plurality of liquid crystal molecules;
a second electrode on the liquid crystal layer;
an insulation layer on the second electrode;
a third electrode on the insulation layer; and
a second substrate on the third electrode,
wherein, when the liquid crystal layer is responsive to the vertical electric field, the liquid crystal molecules are arranged to define a plurality of lenses corresponding to the first electrodes, and when the liquid crystal layer is responsive to the horizontal electric field, the liquid crystal molecules are aligned along first and second directions perpendicular to each other, the first and second directions being parallel to each of the first and second substrates.

* * * * *